US012564870B2

(12) United States Patent
Oh

(10) Patent No.: US 12,564,870 B2
(45) Date of Patent: Mar. 3, 2026

(54) CLEANING EQUIPMENT AND CLEANING METHOD OF SEALING TOOL

(71) Applicant: LG ENERGY SOLUTION, LTD., Seoul (KR)

(72) Inventor: Yoon Jong Oh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 200 days.

(21) Appl. No.: 18/281,493

(22) PCT Filed: Oct. 13, 2022

(86) PCT No.: PCT/KR2022/015523
§ 371 (c)(1),
(2) Date: Sep. 11, 2023

(87) PCT Pub. No.: WO2023/068658
PCT Pub. Date: Apr. 27, 2023

(65) Prior Publication Data
US 2024/0149313 A1 May 9, 2024

(30) Foreign Application Priority Data
Oct. 20, 2021 (KR) ........................ 10-2021-0140230

(51) Int. Cl.
*B08B 7/00* (2006.01)
*B08B 13/00* (2006.01)
*B08B 15/00* (2006.01)

(52) U.S. Cl.
CPC ............ *B08B 7/0035* (2013.01); *B08B 13/00* (2013.01); *B08B 15/00* (2013.01)

(58) Field of Classification Search
None
See application file for complete search history.

(56) References Cited

U.S. PATENT DOCUMENTS

2008/0023028 A1 1/2008 Fujita
2014/0326277 A1* 11/2014 Nettesheim ....... H01J 37/32394 134/1.1

FOREIGN PATENT DOCUMENTS

CN 106783711 A 5/2017
CN 207013387 U 2/2018
(Continued)

OTHER PUBLICATIONS

Machine translation: KR-2021068922-A; Ko et al. (Year: 2021).*
(Continued)

*Primary Examiner* — Natasha N Campbell
(74) *Attorney, Agent, or Firm* — Birch, Stewart, Kolasch & Birch, LLP

(57) ABSTRACT

A cleaning equipment for a sealing tool, which is configured to remove foreign substances accumulated on first and second sealing blocks of the sealing tool, includes: a plasma generation device configured to generate plasma; and a torch device provided with a torch head configured to eject the plasma generated in the plasma generation device to pressing surfaces of the first and second sealing blocks so as to remove the foreign substances accumulated on the pressing surfaces of the first and second sealing blocks, the torch head including: a first torch member provided with a first plasma outlet configured to eject the plasma generated in the plasma generation device to the pressing surface of the first sealing block; and a second torch member provided with a second plasma outlet configured to eject the plasma generated in the plasma generation device to the pressing surface of the second sealing block.

16 Claims, 12 Drawing Sheets

(56) References Cited

FOREIGN PATENT DOCUMENTS

| | | | |
|---|---|---|---|
| CN | 108325923 A | | 7/2018 |
| CN | 208033200 U | | 11/2018 |
| CN | 208429304 U | | 1/2019 |
| CN | 208712410 U | | 4/2019 |
| CN | 110180838 A | | 8/2019 |
| CN | 110695004 A | | 1/2020 |
| CN | 110758844 A | | 2/2020 |
| CN | 110801971 A | | 2/2020 |
| CN | 210304891 U | | 4/2020 |
| CN | 212760132 U | | 3/2021 |
| JP | 2002-337822 A | | 11/2002 |
| JP | 2021-120947 A | | 8/2021 |
| KR | 10-0910748 B1 | | 8/2009 |
| KR | 10-0967702 B1 | | 7/2010 |
| KR | 10-1050047 B1 | | 7/2011 |
| KR | 10-2011-0135183 A | | 12/2011 |
| KR | 10-1107077 B1 | | 1/2012 |
| KR | 10-1453784 B1 | | 10/2014 |
| KR | 10-2016-0090658 A | | 8/2016 |
| KR | 10-2018-0028714 A | | 3/2018 |
| KR | 10-1983372 B1 | | 5/2019 |
| KR | 10-2105331 B1 | | 4/2020 |
| KR | 10-2186957 B1 | | 12/2020 |
| KR | 10-2021-0041983 A | | 4/2021 |
| KR | 2021068922 A | * | 6/2021 |

OTHER PUBLICATIONS

Extended European Search Report for European Application No. 22883881.9, dated Aug. 5, 2024.

International Search Report (PCT/ISA/210) issued in PCT/KR2022/015523, dated Jan. 27, 2023.

* cited by examiner

CLEANING EQUIPMENT AND CLEANING METHOD OF SEALING TOOL

CROSS-REFERENCE TO RELATED APPLICATION

The present application claims the benefit of the priority of Korean Patent Application No. 10-2021-0140230, filed on Oct. 20, 2021, which is hereby incorporated by reference in its entirety.

TECHNICAL FIELD

The present invention relates to cleaning equipment and a cleaning method, which are capable of automatically removing foreign substances, particularly organic substances accumulated in a silicon tool using plasma.

BACKGROUND ART

In general, secondary batteries refer to chargeable and dischargeable, unlike primary batteries that are not chargeable. The secondary batteries are being widely used for mobile phones, notebook computers, and camcorders, electric vehicles, and the like.

The secondary batteries are classified into a can type secondary battery, in which an electrode assembly is embedded in a metal can, and a pouch type secondary battery in which an electrode assembly is embedded in a pouch. The can-type secondary battery has a structure including an electrode assembly, an electrolyte, a can accommodating the electrode assembly and the electrolyte, and a cap assembly mounted in an opening of the can. In addition, the pouch-type secondary battery has a structure including an electrode assembly, an electrolyte, and a pouch accommodating the electrode assembly and the electrolyte.

The pouch-type secondary battery accommodates the electrode assembly inside the pouch and then seals an edge surface of the pouch. Here, a sealing tool for the secondary battery is used.

The sealing tool for the secondary battery includes a pair of sealing blocks that seal both surfaces of a sealing part provided in the pouch in a compressed state.

However, the above-described sealing tool for the secondary battery has a problem in that foreign substances, particularly organic substances are accumulated on a pressing surface of each of the sealing blocks during a sealing process. Particularly, the above-described sealing tool for the secondary battery has a problem in that sealing force is weakened due to the foreign substances accumulated on the pressing surface, or quality defects occur as a thickness quality of the sealing part is deteriorated. In addition, the above-described sealing tool for the secondary battery has a problem in that the sealing part is stabbed by the foreign substances accumulated on the pressing surface of the sealing block, and thus, the quality defects occur.

In order to solve the above problem, the foreign substances accumulated on the pressing surface of the sealing block are removed. However, there is a problem in that work efficiency is deteriorated because a worker manually performs a work, and the pressing surface of the sealing block is damaged because a knife or metal ruler is used.

DISCLOSURE OF THE INVENTION

Technical Problem

The problem to be solved by the present invention is to cleaning equipment and a cleaning method of a sealing tool, in which foreign substances, particularly organic substances (PP, PET, etc.) accumulated on a pressing surface of a sealing block are automatically removed using plasma to effectively remove the foreign substances accumulated on the pressing surface of the sealing block, in particular, to effectively remove foreign substances accumulated on a pair of sealing blocks at the same time, thereby preventing sealing defects and quality defects of a sealing part provided in a pouch from occurring, significantly improving work efficiency, and preventing the pressing surface of the sealing block from being damaged.

Technical Solution

Cleaning equipment of a sealing tool according to the present invention for achieving the above object is configured to remove foreign substances accumulated on a first sealing block and a second sealing block spaced from the first sealing block in a first direction. The cleaning equipment for the sealing tool includes: a plasma generator configured to generate plasma; and a torch device having a torch head configured to eject the plasma generated in the plasma generator to pressing surfaces of the first sealing block and the second sealing block so as to remove foreign substances accumulated on pressing surfaces of the first sealing block and the second sealing block, the torch head includes: a first torch member having a first plasma outlet configured to eject the plasma generated in the plasma generator to the pressing surface of the first sealing block; and a second torch member having a second plasma outlet configured to eject the plasma generated in the plasma generator to the pressing surface of the second sealing block.

The torch head may further include a torch body to which the first torch member and the second torch member are coupled, the torch body may include: a fixing plate; a first bracket located at a first end of the fixing plate, the first torch member being inclinedly coupled to the first bracket so that the first plasma outlet faces the pressing surface of the first sealing block; and a second bracket located at a second end of the fixing plate, the second torch member being inclinedly coupled to the second bracket so that the second plasma outlet faces the pressing surface of the second sealing block.

The first plasma outlet of the first torch member may be spaced a distance of 1.0 mm to 5.0 mm from the pressing surface of the first sealing block, and the second plasma outlet of the second torch member may be spaced a distance of 1.0 mm to 5.0 mm from the pressing surface of the second sealing block.

The torch body may further include: a first angle adjusting piece coupling the first torch member to the first bracket so an angle of the first torch member is adjustable with respect to the pressing surface of the first sealing block; and a second angle adjusting piece coupling the second torch member to the second bracket so that an angle of the second torch member is adjustable with respect to the pressing surface of the second sealing block.

The torch head may further include: a first height adjusting member coupling the first bracket to the first end of the fixing plate so as to be movable in the first direction; and a second height adjusting member coupling the second bracket to the second end of the fixing plate so as to be movable in the first direction.

The fixing plate may include: a first plate located at the first end of the fixing plate; and a second plate located at the second end of the fixing plate. The first height adjusting member may include: a first guide piece connected to the first bracket; and a first adjusting screw screw-coupled to the first guide piece by passing through the first plate of the fixing plate, whereby, when the first adjusting screw rotates forward or backward, the first guide piece moves along the first direction. The second height adjusting member may include: a second guide piece connected to the second bracket; and a second adjusting screw screw-coupled to the second guide piece by passing through the second plate of the fixing plate, whereby, when the second adjusting screw rotates forward or backward, the second guide piece moves along the first direction.

The torch device may further include a first moving member configured to move the torch head in a longitudinal direction of the first sealing block and the second sealing block, the first moving member may include: a guide rail extending in the longitudinal direction of the first guide block and the second sealing block; a guide piece configured to move the torch head along the guide rail; and a first driver configured to move the guide piece along the guide rail.

The torch device may include a second moving member configured to move the torch head in a width direction of the first sealing block and the second sealing block so that the torch head is disposed at the pressing surfaces of the first sealing block and the second sealing block or to return the torch head to an original position, the second moving member may include: a movable piece located between the guide piece and the torch head; and a second driver configured to move the movable piece in the width direction of the first sealing block and the second sealing block.

The cleaning equipment may further include an exhaust device configured to remove smoke, odor, or harmful gases, which are generated while the foreign substances accumulated on the pressing surfaces of the first sealing block and the second sealing block are removed.

The exhaust device may include an ozone remover configured to remove ozone contained in the harmful gases.

A cleaning method of a sealing tool is performed to remove foreign substances accumulated on a first sealing block and a second sealing block spaced from the first sealing block in a first direction. The cleaning method of the sealing tool includes: generating plasma using a plasma generator; and ejecting the plasma generated by the plasma generator to pressing surfaces of the first sealing block and the second sealing block to remove the foreign substances accumulated on the pressing surfaces of the first sealing block and the second sealing the torch head having a first torch member and a second torch member, the plasma being ejected from the first torch member and the second torch member to the pressing surfaces of the first sealing block and the second sealing block, respectively.

When the plasma is ejected on the pressing surfaces, radical oxygen (O) existing in the plasma and carbon (C), hydrogen (H), and oxygen (O), which exist in the foreign substances, may chemically react with each other to form carbon dioxide ($CO_2$) and water ($H_2O$) so as to be removed.

The cleaning method may further include, before moving the torch head toward the first sealing block and the second sealing block so that first torch member and the second torch member of the torch head are disposed to be spaced an effective distance from the pressing surfaces of the first sealing block and the second sealing block.

The ejecting the plasma may further include moving the torch head in a longitudinal direction of the first sealing block and the second sealing block, thereby removing the foreign substances accumulated on the pressing surfaces of the first sealing block and the second sealing block.

The ejecting the plasma may further include removing smoke, odor, and harmful gases, which are generated while the foreign substances are removed, through an exhaust device.

Advantageous Effects

In the cleaning equipment and a cleaning method of the sealing tool, the foreign substances, particularly the organic substances (PP, PET, etc.) may be automatically removed using the plasma to effectively remove the foreign substances accumulated on the pressing surface of the sealing block, in particular, to effectively remove the foreign substances accumulated on the pair of sealing blocks at the same time, thereby preventing the sealing defects and the quality defects of the sealing part provided in the pouch from occurring, significantly improving the work efficiency, and preventing the pressing surface of the sealing block from being damaged.

MODE FOR CARRYING OUT THE INVENTION

Figure 1:
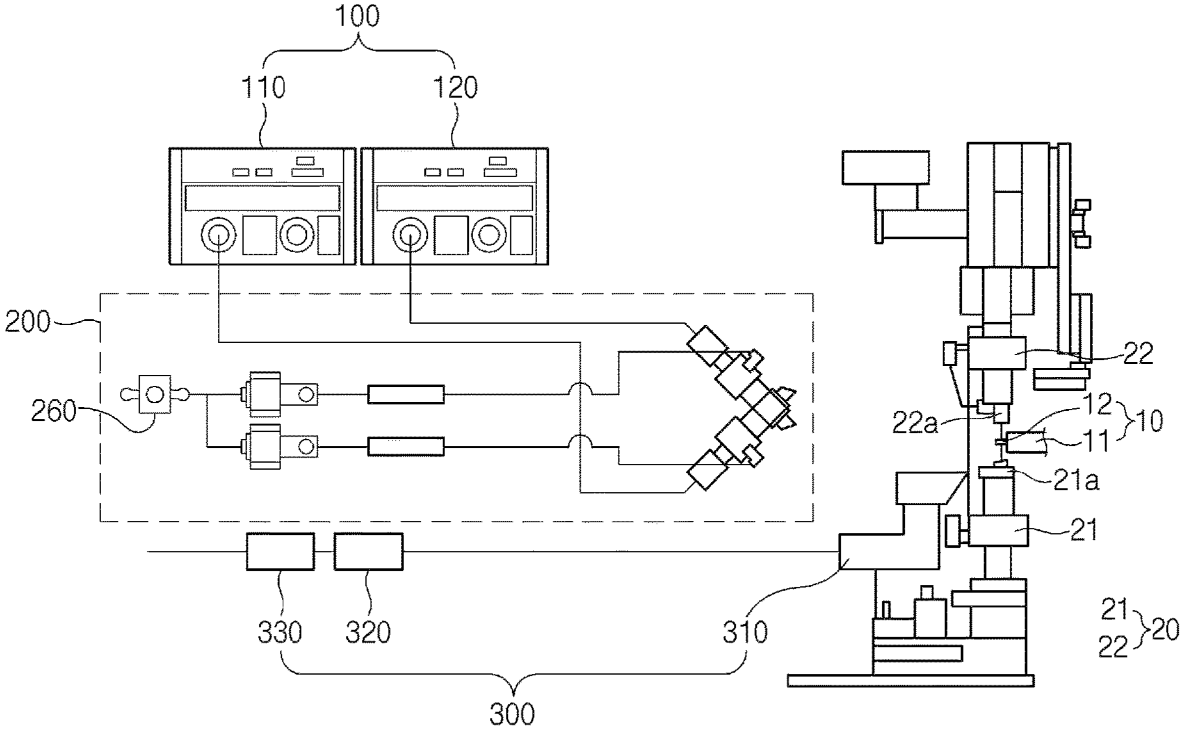
FIG. 1 is a schematic process view illustrating cleaning equipment of a sealing tool according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Secondary Battery According to the Present Invention]

Referring to FIG. 1, a secondary battery of the present invention includes an electrode assembly and a pouch 10 accommodating the electrode assembly. The pouch 10 includes an accommodation part 11 accommodating the electrode assembly and a sealing part 12 sealing an edge of the accommodation part.

Here, the sealing part 12 of the pouch 10 is sealed using a sealing tool 20, and the sealing tool 20 includes first and second sealing blocks 21 and 22 disposed in a vertical direction. That is, the first and second sealing blocks 21 and 22 compress and seal the sealing part 12.

The sealing tool 20 having such a structure has a problem in that foreign substances are accumulated on pressing surfaces 21*a* and 22*a* of the first and second sealing blocks 21 and 22 during the compression process of the sealing part.

The foreign substances may be foreign matters, and the foreign substances may be polypropylene (PP) or polyethylene (PET).

If the foreign substances are accumulated on the pressing surfaces 21*a* and 22*a* of the first and second sealing blocks 21 and 22, quality defects of the sealing part, thickness defects of the sealing part, and marks such as stab and scratch on the sealing part may be prevented from occurring.

In order to remove, particularly, automatically remove the foreign substances accumulated on the pressing surfaces 21*a* and 22*a* of the first and second sealing blocks 21 and 22, the cleaning equipment of the sealing tool according to the first embodiment of the present invention is used.

That is, the cleaning equipment of the sealing tool according to the first embodiment of the present invention may remove the foreign substances accumulated on the pressing surfaces 21*a* and 22*a* of the first and second sealing blocks 21 and 22 by using the plasma and, in particular, may be automated to improve work efficiency.

Hereinafter, the cleaning equipment of the sealing tool according to the first embodiment of the present invention will be described in detail with reference to the accompanying drawings.

[Cleaning Equipment of Sealing Tool According to First Embodiment of the Present Invention]

As illustrated in FIGS. 1 to 9, the cleaning equipment of the sealing tool according to the first embodiment of the present invention includes a plasma generation device 100, a torch device 200 automatically removing foreign substance accumulated on pressing surfaces 21*a* and 22*a* of first and second sealing blocks 21 and 22 by using plasma generated in the plasma generation device 100, and exhaust device 300 removing smoke, odor, and harmful gases, which are generated when removing the foreign substances.

Plasma Generation Device

The plasma generation device 100 is configured to generate the plasma. The plasma refers to a state in which a gas is heated at an ultra-high temperature and is separated into electrons and ions having positive charges.

Referring to FIG. 1, the plasma generation device 100 includes a first plasma generator 110 and a second plasma generator 120. The first plasma generator 110 supplies the plasma to a first torch member 211, and the second plasma generator 120 supplies the plasma to a second torch member 212.

The plasma generation device is a commonly widely used device, and thus, detailed descriptions thereof will be omitted.

Torch Device

Referring to FIGS. 5 to 8, the torch device 200 is configured to remove the foreign substances accumulated on the pressing surfaces 21*a* and 22*a* of the first and second sealing blocks 21 and 22 by using the plasma supplied from the plasma generation device. That is, the torch device 200 includes a torch head 210, a first moving member 240, and a second moving member 250.

The torch head 210 has a structure which ejects the plasma generated by the plasma generation device to the pressing surfaces of the first and second sealing blocks to remove the foreign substances accumulated on the pressing surfaces of the first and second sealing blocks. That is, the torch head 210 includes a first torch member 211, a second torch member 212 and a torch body 213.

The first torch member 211 is provided with a first plasma outlet 211*a* that ejects the plasma generated by the first plasma generator of the plasma generation device to the pressing surface 21*a* of the first sealing block 21.

The second torch member 212 is provided with a second plasma outlet 212*a* that ejects the plasma generated by the second plasma generator of the plasma generation device to the pressing surface 22*a* of the second sealing block 22.

The torch body 213 has a structure which fixes the first torch member 211 in a state, in which the first plasma outlet 211*a* faces the pressing surface 21*a* of the first sealing block 21, and fixes the second torch member 212 in a state, in which the second plasma outlet 212*a* faces the pressing surface 22*a* of the second sealing block 22.

That is, the torch body 213 includes a fixing plate 213*a*, a first bracket 213*b* which is fixed to one end of the fixing plate 213*a* and to which the first torch member 211 is inclinedly coupled so that the first plasma outlet 211*a* faces the pressing surface of the first sealing block, and a second bracket 213*c* which is fixed to the other end of the fixing plate 213*a* and to which the second torch member 212 is inclinedly coupled so that the second plasma outlet 212*a* faces the pressing surface of the second sealing block.

Figure 8:
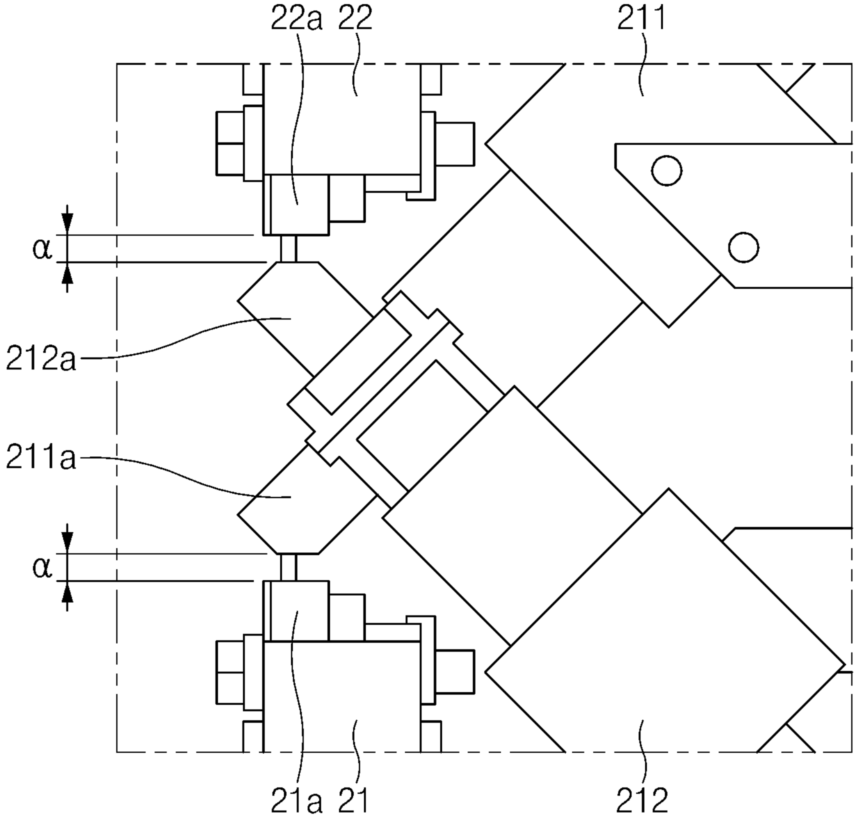
FIG. 8 is a partial enlarged view of FIG. 6.
Figure 9:
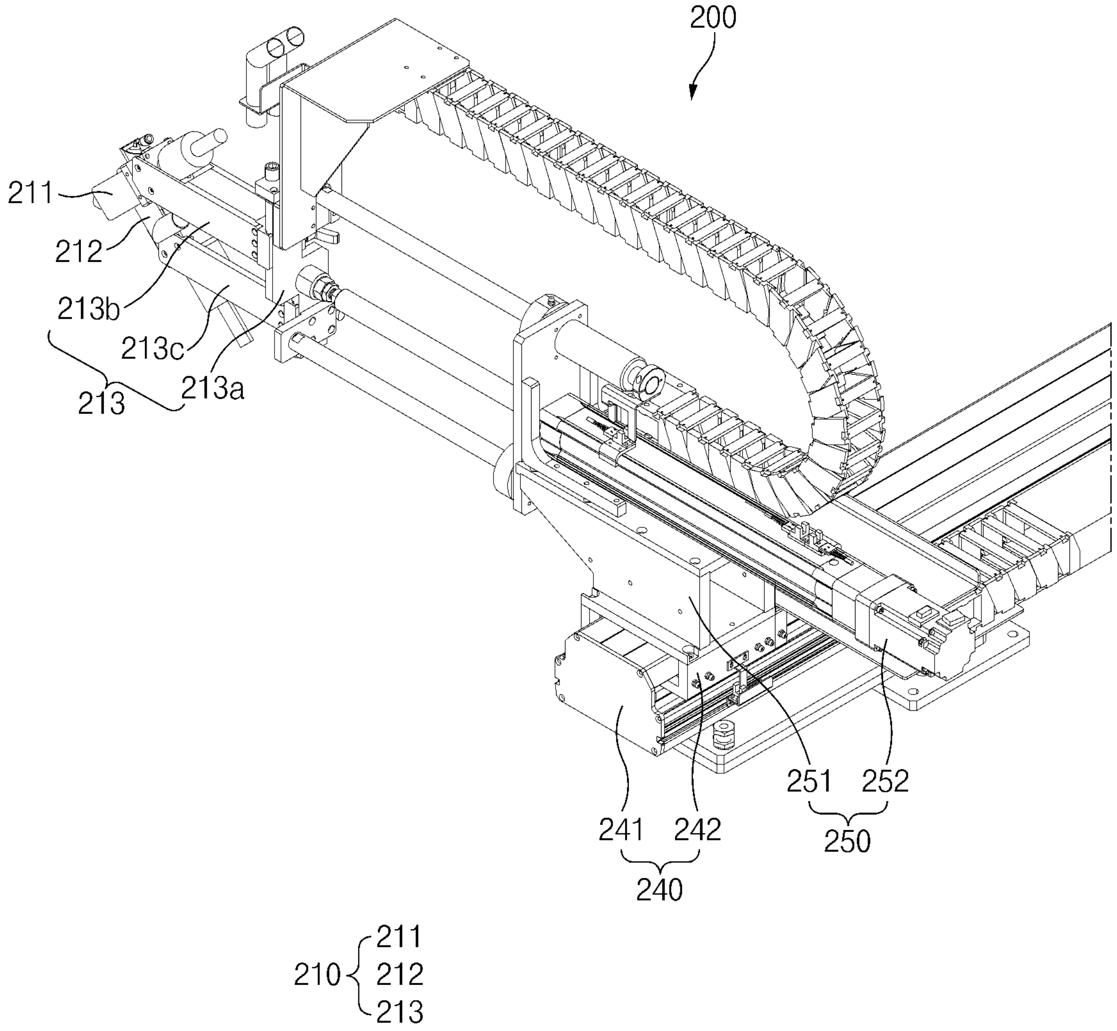
FIG. 9 is a partial enlarged view of FIG. 3.

Referring to FIG. 8, the first plasma outlet 211*a* of the first torch member 211 has an effective distance a of 1.0 mm to 5.0 mm from the pressing surface 21*a* of the first sealing block 21, preferably has an effective distance (a) of 3.0 mm. That is, there is a distance of 1.0 mm to 5.0 mm between the first plasma outlet 211*a* and the pressing surface 21*a* of the first sealing block 21. In addition, the second plasma outlet 212*a* of the second torch member 212 has an effective distance of 1.0 mm to 5.0 mm from the pressing surface 22*a* of the second sealing block 22, preferably has an effective distance (a) of 3.0 mm. That is, there is a distance of 1.0 mm to 5.0 mm between the second plasma outlet 212*a* and the pressing surface 22*a* of the second sealing block 22. This is done for stably ejecting the plasma discharged from the plasma outlet to the pressing surface of the sealing block, and as a result, effectively removing the foreign substances accumulated on the pressing surface.

On the other hand, if the effective distance between the plasma outlet and the pressing surface is 1.0 mm or less, the plasma may not be effectively ejected over the entire pressing surface, and if the effective distance is 5.0 mm or more, there is a problem in that plasma efficiency is deteriorated.

Figure 6:
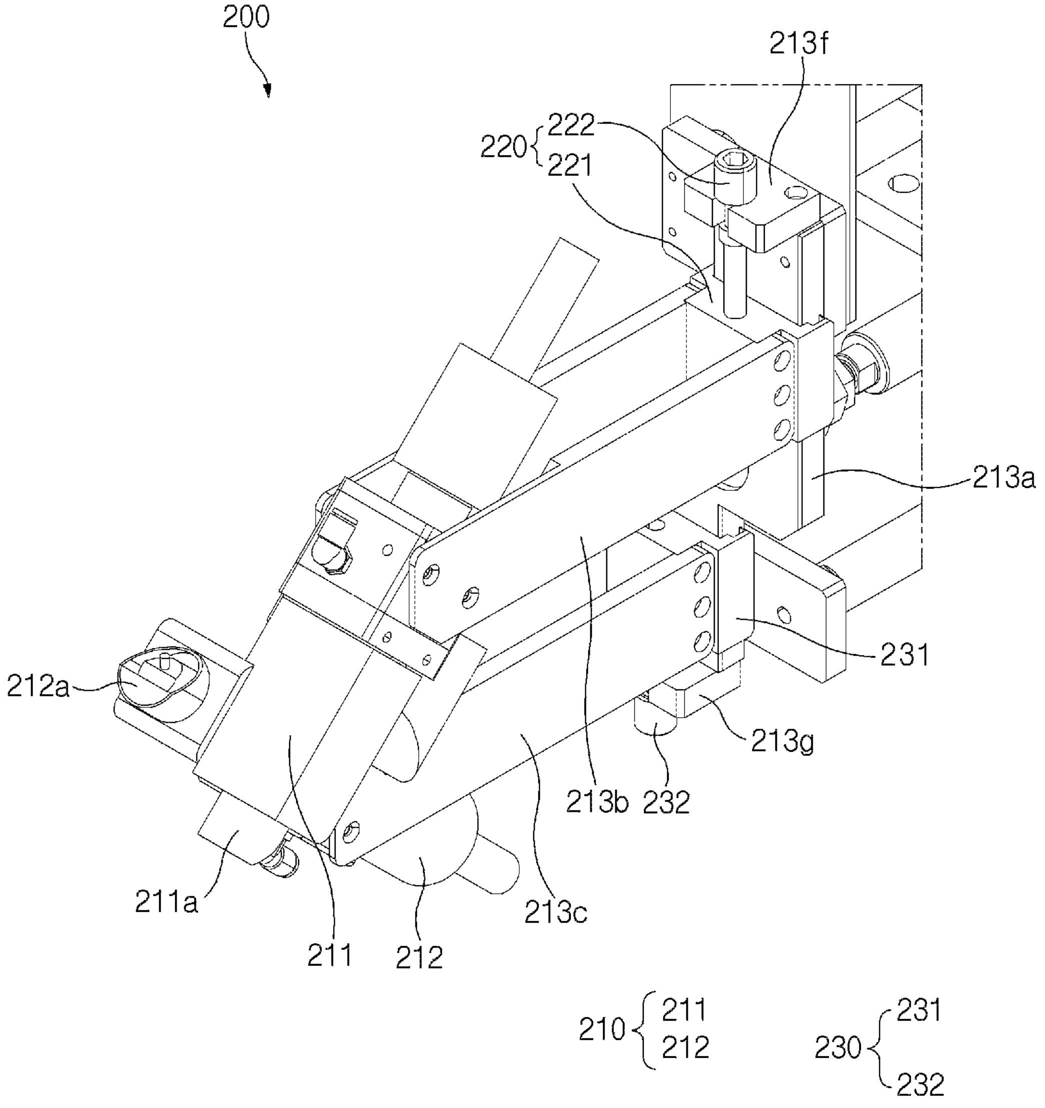
FIG. 6 is a partial enlarged view of FIG. 5.
Figure 7:
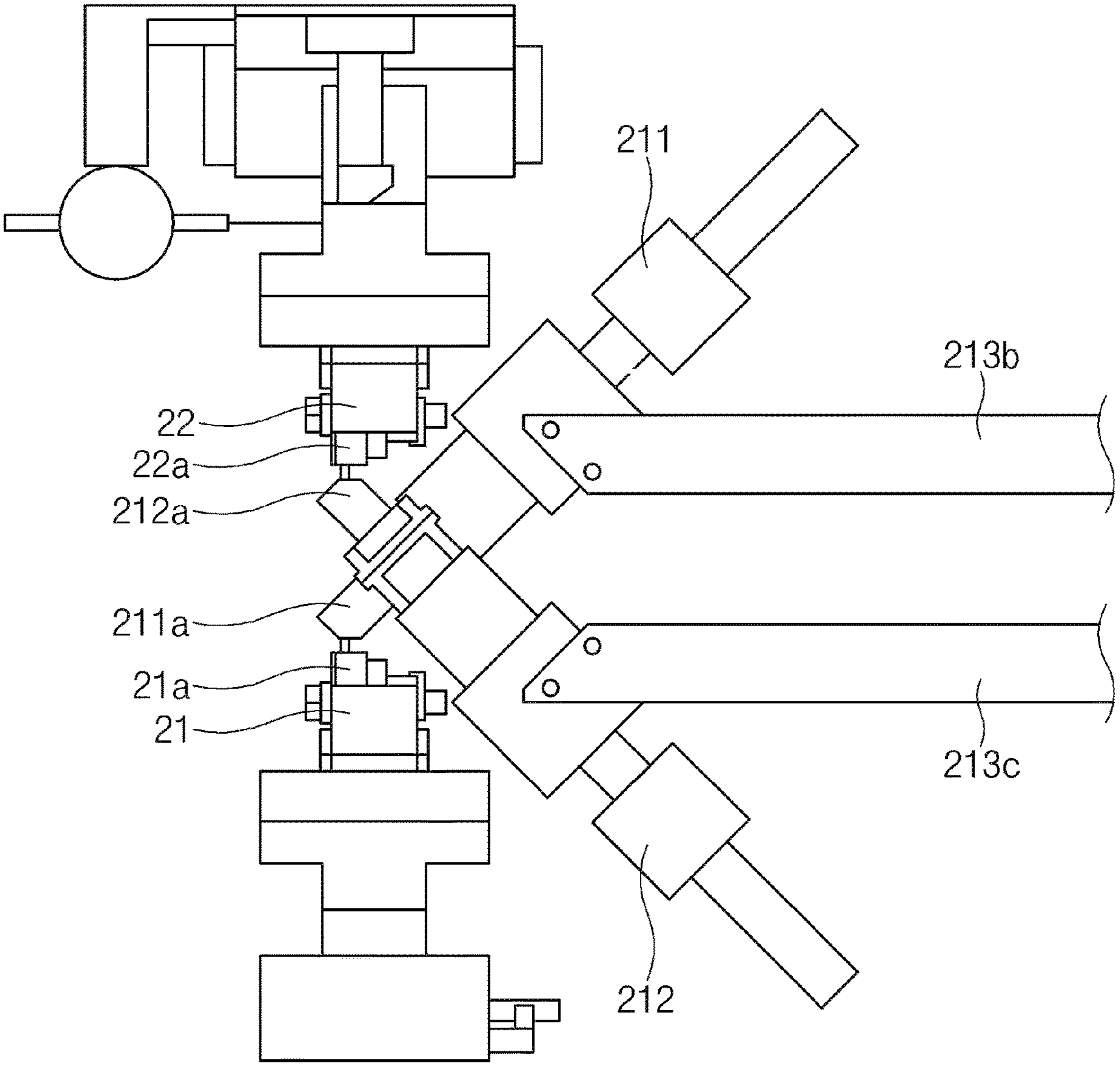
FIG. 7 is a side view of FIG. 6.

Referring to FIG. 6, the fixing plate 213*a* includes an upper plate which is provided at an upper right side with respect to a center line O and to which the first bracket 213*b* is fixed, and a lower plate which is provided at a lower left side with respect to the center line O and to which the second bracket 213*c* is fixed. In addition, the upper plate and the lower plate have a structure in which the plates are connected to each other. Thus, the fixing plate 213*a* may stably couple the first and second brackets 212*b* and 213*c* to each other. In particular, the first and second torch members 211 and 212 coupled to the first and second brackets may be disposed to cross each other without interference.

Referring to FIG. 6, the torch head 210 further includes first and second height adjusting members 220 and 230 which adjust heights of the first and second torch members 211 and 212 coupled to the first and second brackets 212*b* and 213*c*. That is, the first and second height adjusting members 220 and 230 may adjust the heights of the first and second torch members to adjust the effective distance between the first plasma outlet and the pressing surface of the first sealing block and the effective distance between the second plasma outlet and the pressing surface of the second sealing block.

For example, the first height adjusting member 220 is configured to vertically adjust the height of the first torch member through the first bracket and includes a first guide piece 221 to which the first bracket 213*b* is fixed and which is coupled to one end of the fixing plate 213*a* so as to be movable vertically, and a first adjusting screw 222 which is screw-coupled to the first guide piece 221 by passing through one plate 213*f* (a plate provided on an upper end of the fixing plate when viewed in FIG. 6) so that the first guide piece 221 moves upward or downward when the first adjusting screw rotates forward or backward. Thus, when the first adjusting screw 222 rotates forward or backward, the first guide piece 221 may ascend or descend along a screw thread of the first adjusting screw 222, and the first bracket 213*b* fixed to the guide piece may ascend or descend, and thus, the first torch member 211 coupled to the first bracket 213*b* may ascend or descend to adjust the height. This is done for adjusting the effective distance between the first plasma outlet and the pressing surface of the first sealing block.

In addition, the second height adjusting member 230 includes a second guide piece 231 to which the second bracket 213*c* is fixed and which is coupled to the other end of the fixing plate 213*a* so as to be movable vertically, and a second adjusting screw 232 which is screw-coupled to the second guide piece 231 by passing through the other plate 213*g* (a plate provided on a lower end of the fixing plate when viewed in FIG. 6) so that the second guide piece 231 moves upward or downward when the second adjusting screw rotates forward or backward. Thus, when the second adjusting screw 232 rotates forward or backward, the second guide piece 231 may ascend or descend along a screw thread of the second adjusting screw 232, and the second bracket 213*c* fixed to the guide piece may ascend or descend, and thus, the second torch member 212 coupled to the second bracket 213*c* may ascend or descend to adjust the height. This is done for adjusting the effective distance between the second plasma outlet and the pressing surface of the second sealing block.

Figure 2:
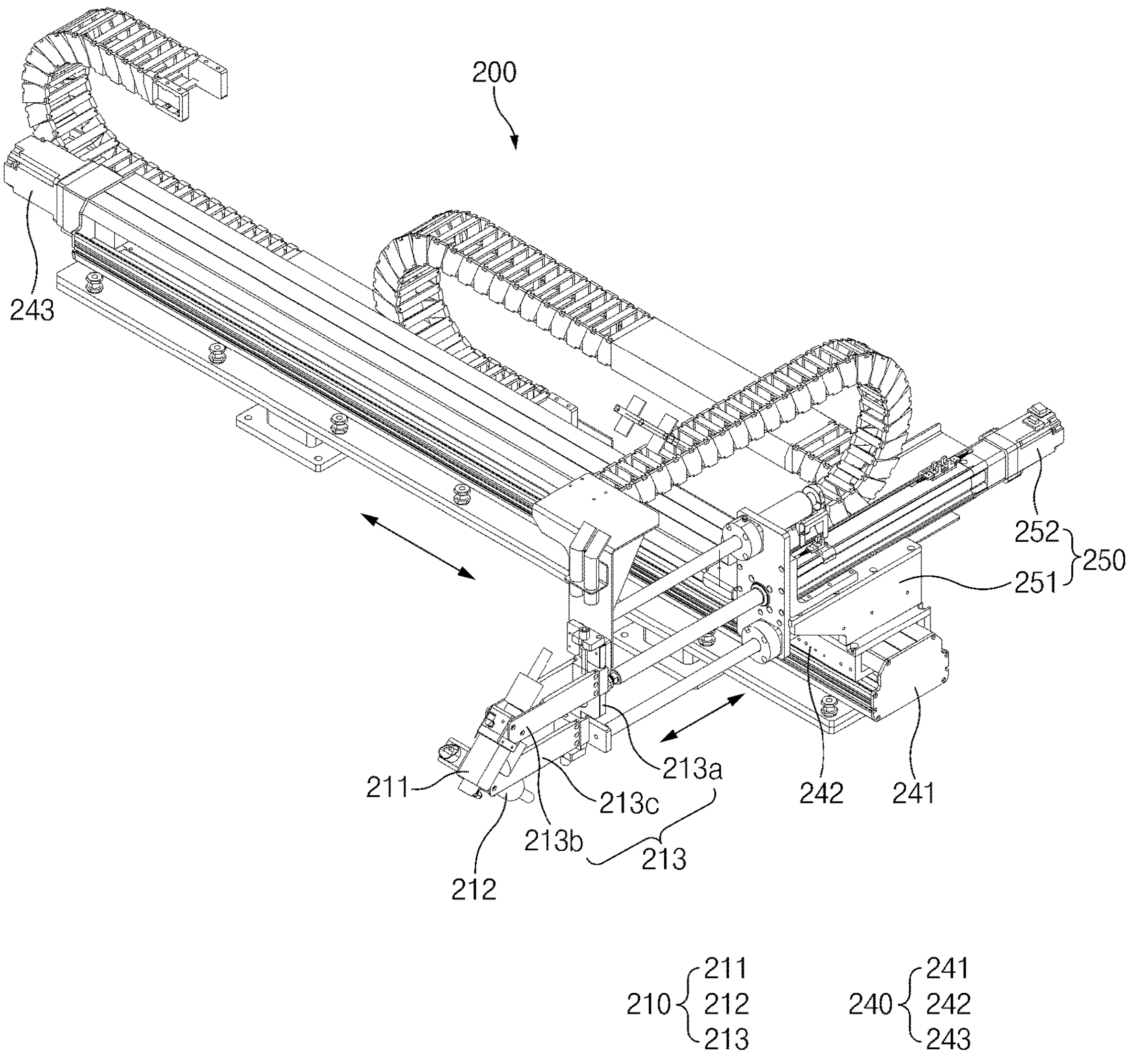
FIG. 2 is a front perspective view illustrating a torch device provided in the cleaning equipment of the sealing tool according to the first embodiment of the present invention.

Referring to FIG. 2, the torch device 200 may include a first moving member 240 through which the torch head 210 moves in a longitudinal direction (left and right direction when viewed in FIG. 2) of the first and second sealing blocks to remove the foreign substances accumulated on the entire pressing surfaces of the first and second sealing blocks.

The first moving member 240 includes a guide rail 241 disposed in the longitudinal direction (left and right direction when viewed in FIG. 2) of the first and second sealing blocks, a guide piece 242 which is provided on the guide rail 241 so as to be movable in the longitudinal direction of the first and second sealing blocks and on which the torch head 210 is provided, and a first driving piece 243 through which the guide piece 242 moves in the longitudinal direction of the first and second sealing blocks or returns to its original position.

That is, when the first driving piece 243 operates, the first moving member 240 may allow the guide piece to move in the longitudinal direction of the first and second sealing blocks along the guide rail 241. Here, the torch head 210 fixed to the guide piece 242 may move to be interlocked, thereby removing the foreign substances accumulated on the entire pressing surfaces of the first and second sealing blocks. Here, the first moving member 240 may be a driving motor.

Figure 3:
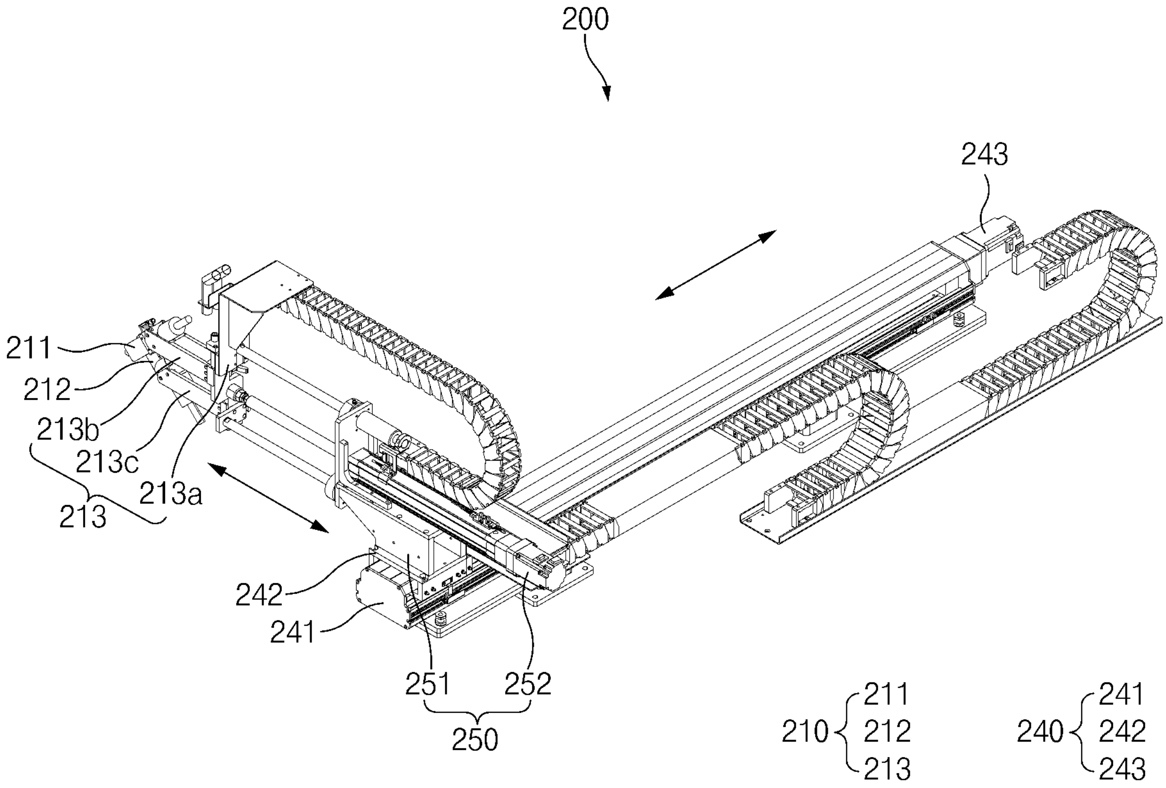
FIG. 3 is a rear perspective view illustrating the torch device provided in the cleaning equipment of the sealing tool according to the first embodiment of the present invention.
Figure 4:
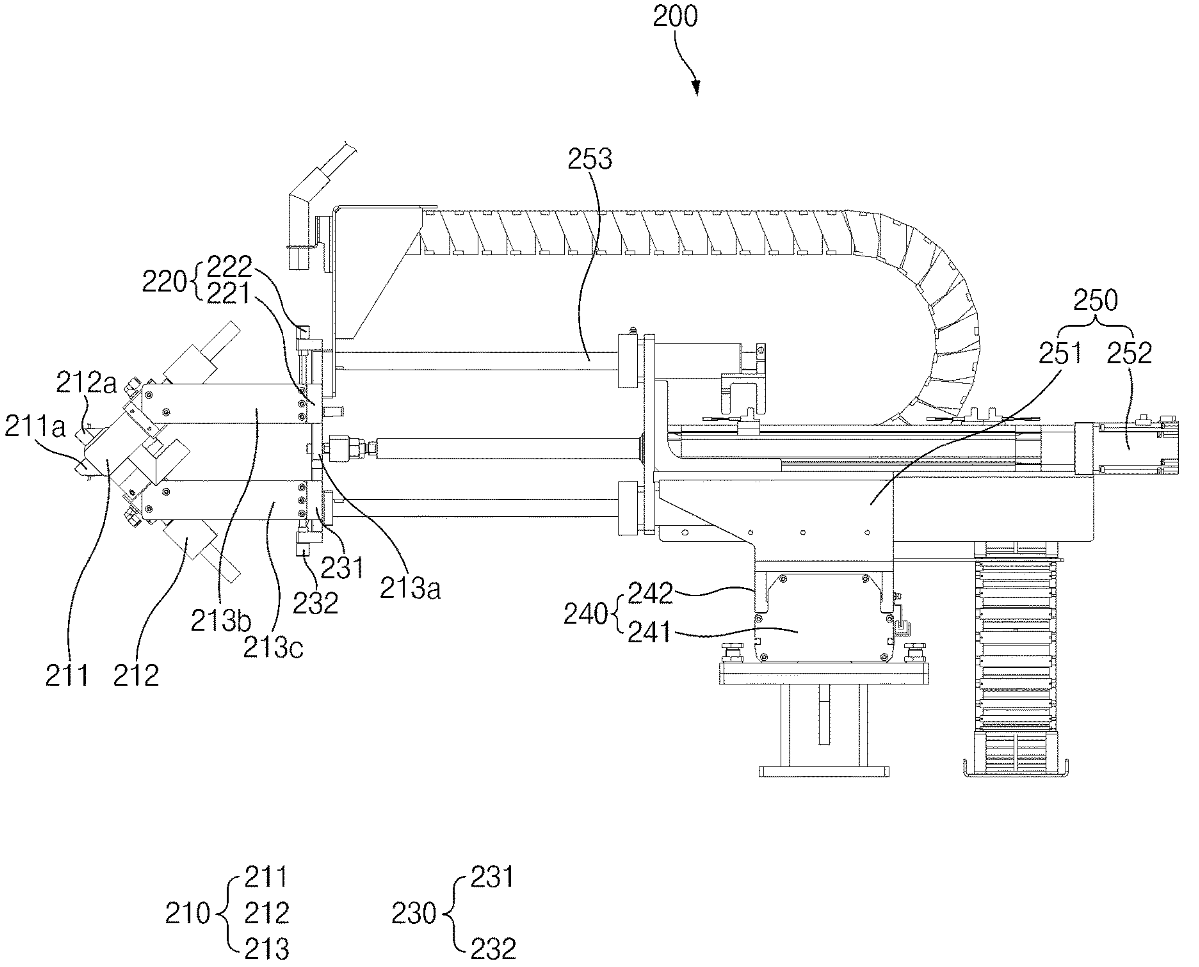
FIG. 4 is a side view illustrating the torch device provided in the cleaning equipment of the sealing tool according to the first embodiment of the present invention.
Figure 5:
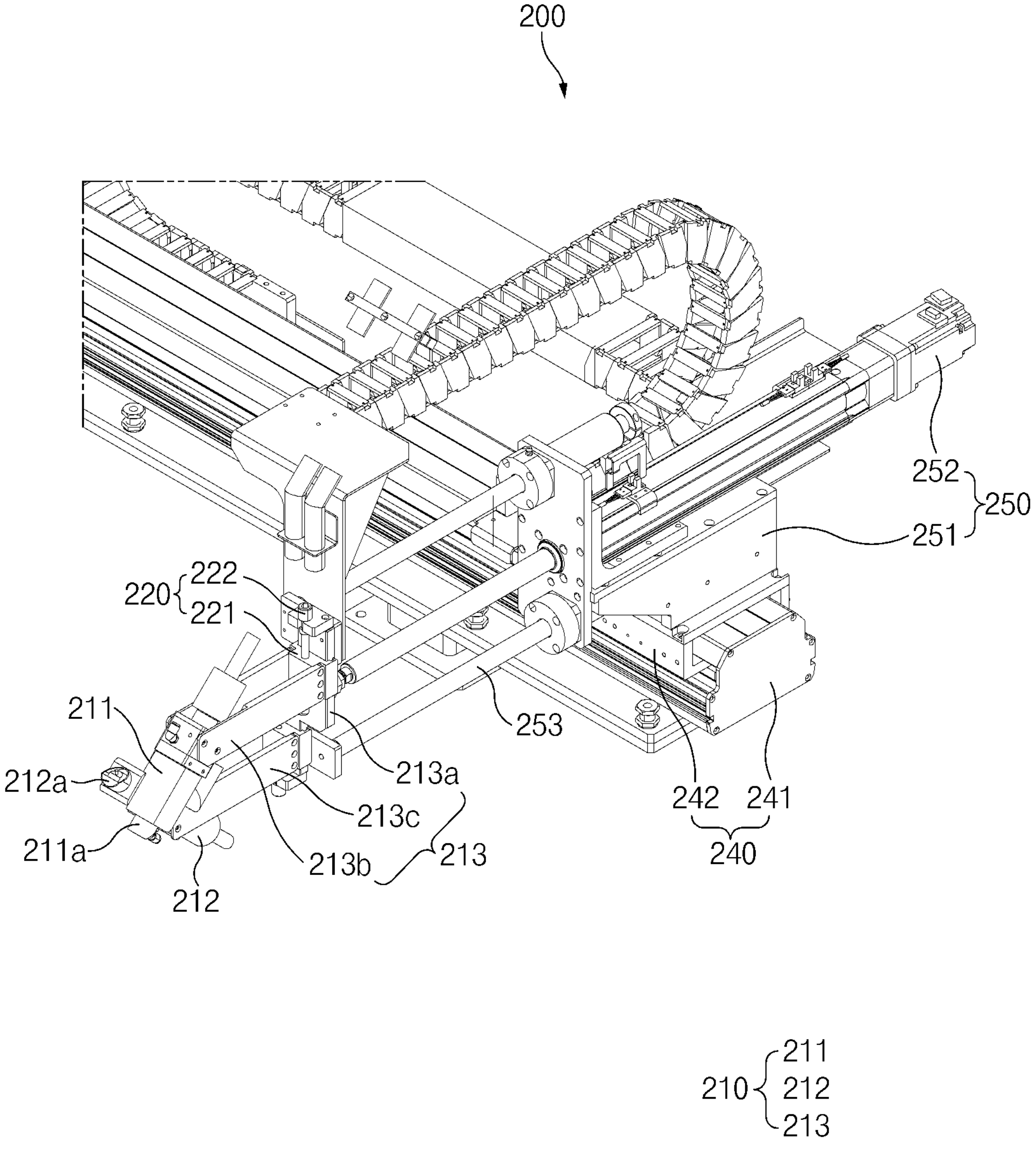
FIG. 5 is a partial enlarged view of FIG. 2.

Referring to FIG. 3, the torch device 200 may include a second moving member 250 through which the torch device moves forward so that the torch head 210 is disposed on the pressing surfaces of the first and second sealing blocks 21 and 22 only when removing the foreign substances accumulated on the pressing surfaces of the first and second sealing blocks 21 and 22.

That is, the second moving member 250 includes a movable piece 251 provided between the guide piece 242 and the torch head 210 and a second driving piece 252 through which the torch head 210 provided on the movable piece 251 moves forward toward the pressing surfaces of the first and second sealing blocks or move backward. Thus, when the second driving piece 252 operates, the torch head 210 may move forward toward the pressing surfaces of the first and second sealing blocks or move backward. Here, the second driving piece 252 may be an electric cylinder.

The second moving member 250 may further include a guide rod 253 that guides the torch head 210 so that the torch head 210 moves straightly toward the pressing surfaces of the first and second sealing blocks. The guide rod 253 has one end fixed to the fixing plate 213*a* of the torch head 210 and the other end coupled to a vertical piece provided on the movable piece 251 so as to be movable toward the pressing surfaces of the first and second sealing blocks.

The torch device 200 may further include an air supply member 260 that ejects air together with the plasma to the pressing surfaces of the first and second sealing blocks.

Therefore, the torch device 200 may stably eject the plasma supplied from the plasma generation device to the pressing surfaces of the first and second sealing blocks, and as a result, effectively remove the foreign substances accumulated on the pressing surfaces of the first and second sealing blocks.

Exhaust Device

Referring to FIG. 1, the exhaust device 300 is configured to remove smoke, odor, and harmful gases, which are generated while the foreign substances accumulated on the pressing surfaces of the first and second sealing blocks are removed. That is, the exhaust device 300 includes an exhaust tube 310 which is disposed close to the pressing surfaces 21*a* and 22*a* of the first and second sealing blocks 21 and 22 and in which an inhaler configured to inhale the smoke, the odor, and the harmful gases, which are generated while the foreign substances accumulated on the pressing surfaces of the first and second sealing blocks are removed is installed, and a filter 320 configured to filter the smoke, the odor, and the harmful gases, which are inhaled into the exhaust tube 310.

Here, the exhaust device 300 may generate ozone (03) by a chemical reaction between the plasma and the foreign substances and may further include an ozone remover 330 to remove the ozone.

Thus, the exhaust device 300 may effectively remove the harmful gases generated while the foreign substances accumulated on the pressing surfaces 21*a* and 22*a* of the first and second sealing blocks 21 and 22 are removed.

Therefore, the cleaning equipment of the sealing tool according to the first embodiment of the present invention may effectively remove the foreign substances accumulated on the pressing surfaces of the first and second sealing blocks by using the plasma, thereby maintaining the sealing quality, in particular, improving the work efficiency.

Hereinafter, a cleaning method of the sealing tool according to the first embodiment of the present invention will be described.

[Cleaning Method of Sealing Tool According to First Embodiment of the Present Invention]

Figure 10:
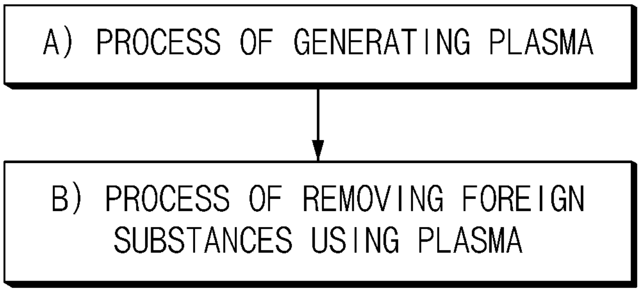
FIG. 10 is a flowchart illustrating a cleaning method of the sealing tool according to the first embodiment of the present invention.

As illustrated in FIG. 10, the cleaning method of the sealing tool according to the first embodiment of the present invention is performed to remove foreign substances accumulated on pressing surfaces 21*a* and 22*a* of first and second sealing blocks 21 and 22, which are provided symmetrically in a vertical direction.

That is, the cleaning method of the sealing tool according to the first embodiment of the present invention includes a process (a) of generating plasma through a plasma generation device 100; and a process (b) of ejecting the plasma generated by the plasma generation device 100 to the pressing surfaces 21*a* and 22*a* of the first and second sealing blocks 21 and 22 to remove the foreign substances accumulated on the pressing surfaces 21*a* and 22*a* of the first and second sealing blocks 21 and 22.

A torch device 200 includes a torch head 210, a first height adjusting member 220, a second height adjusting member 230, a first moving member 240, a second moving member 250, and an air supply member 260. In addition, the torch head 210 includes a first torch member 211 and a second torch member 212.

Here, in the process (b), the plasma generated in the plasma generation device 100 may be ejected to the pressing surface 21*a* of the first sealing block 21 through a first plasma outlet 211*a* of the first torch member 211 coupled to one end of a torch body 213, and the plasma generated in the plasma generation device 100 may be ejected to the pressing surface 22*a* of the second sealing block 22 through a second plasma outlet of the second torch member 212 coupled to the other end of a torch body 213. Thus, the foreign substances accumulated on the pressing surfaces of the first and second sealing blocks may be removed.

For example, in the process (b), most of the foreign substances accumulated on the pressing surface may be organic materials (polypropylene, polyethylene), and when the plasma is ejected on the pressing surface, radical oxygen (O) existing in the plasma and carbon (C), hydrogen (H), and oxygen (O), which exist in the foreign substances, chemically react with each other to form carbon dioxide ($CO_2$) and water ($H_2O$) so as to be removed.

$$C+2O=CO_2$$

$$2H+O=H_2O \quad \text{[Chemical formula]}$$

Before performing the process (a), a process of allowing the torch device 200 to move forward toward the pressing surfaces 21*a* and 22*a* of the first and second sealing blocks 21 and 22 so that the first plasma outlet 211*a* of the first torch member 211 is disposed to be spaced an effective distance from the pressing surface of the first sealing block, and the second plasma outlet 121*a* of the second torch member 212 is disposed to be spaced an effective distance from the pressing surface of the second sealing block may be further performed.

That is, when there is no need to remove the foreign substances, the torch device is disposed to be spaced a set distance from the sealing tool. Thereafter, when removal of the foreign substances is required, the torch device 200 may move forward toward the sealing tool through the second moving member 250, and thus, the torch head 210 may be disposed at the pressing surfaces of the first and second sealing blocks 21 and 22.

The process (b) may further include a process of allowing the torch device 200 to move in a longitudinal direction of the first and second sealing blocks, thereby removing the foreign substances accumulated on the entire pressing surfaces of the first and second sealing blocks.

That is, in the process (b), the torch device 200 may move in the longitudinal direction of the first and second sealing blocks through the first moving member 240 or return to its original position, and thus, the first and second torch members may pass through the entire pressing surfaces of the first and second sealing blocks, and as a result, the foreign substances accumulated on the entire pressing surfaces may be removed.

The process (b) may further include a process of removing the smoke, the odor, and the harmful gases, which are generated during the removal of the foreign substances by inhaling the smoke, the odor, and the harmful gases through the exhaust device 300.

That is, the exhaust device 300 may inhale the smoke, the odor, and the harmful gases, which are generated while the foreign substances accumulated on the pressing surfaces of the first and second sealing blocks are removed through the exhaust tube 310 in which the inhaler is installed, and the smoke, the odor, and the harmful gases may be filtered through a filter 320 so as to be removed. Particularly, the exhaust device 300 includes an ozone remover, and thus ozone generated by a chemical reaction between the plasma and the foreign substances may be removed.

Therefore, in the cleaning method of the sealing tool according to the first embodiment of the present invention, the foreign substances accumulated on the pressing surfaces of the first and second sealing blocks may be removed through the above processes.

Hereinafter, in descriptions of another embodiment of the present invention, constituents having the same function as the above-mentioned embodiment have been given the same reference numeral in the drawings, and thus duplicated description will be omitted.

[Cleaning Equipment of Sealing Tool According to Second Embodiment of the Present Invention]

Figure 11:
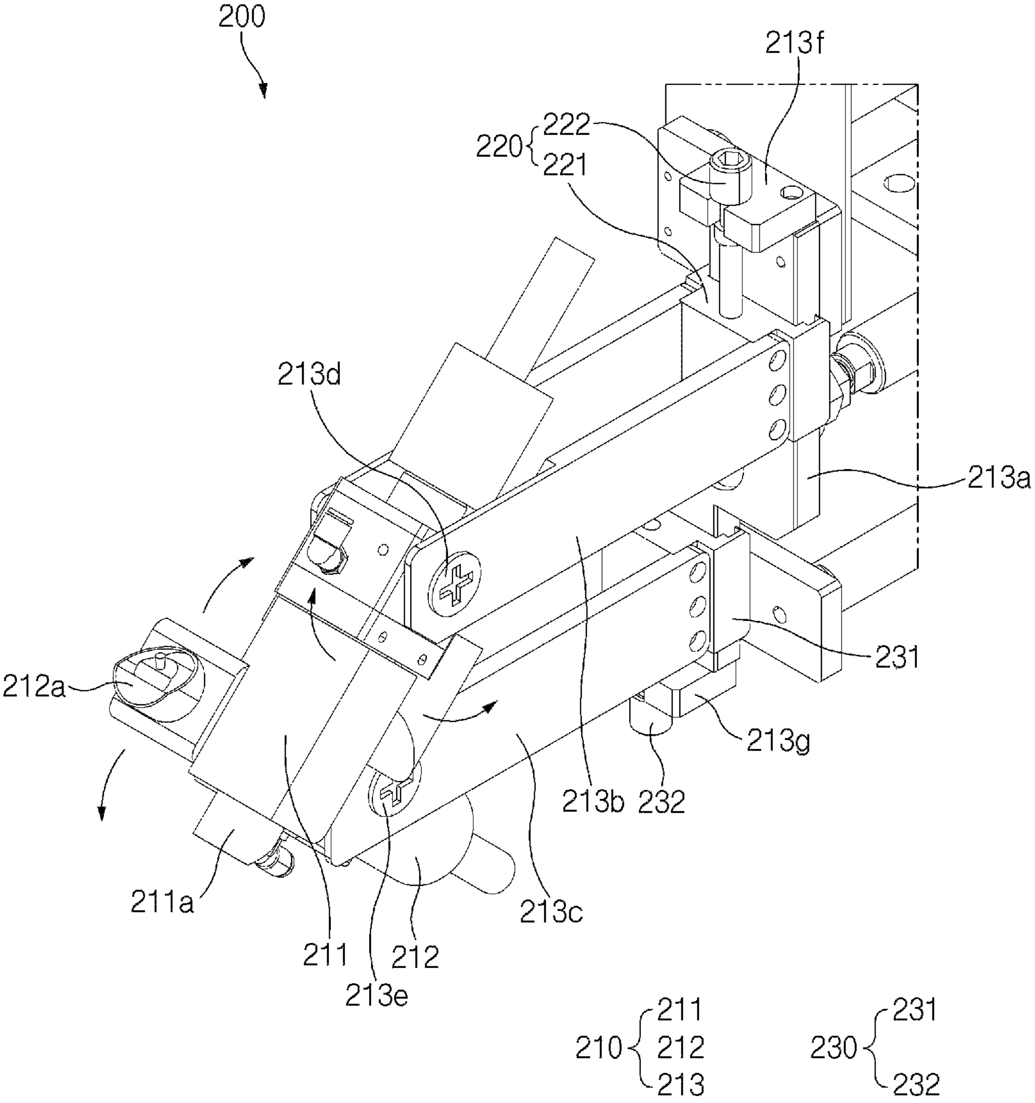
FIG. 11 is a perspective view illustrating a torch device of cleaning equipment of a sealing tool according to a second embodiment of the present invention.
Figure 12:
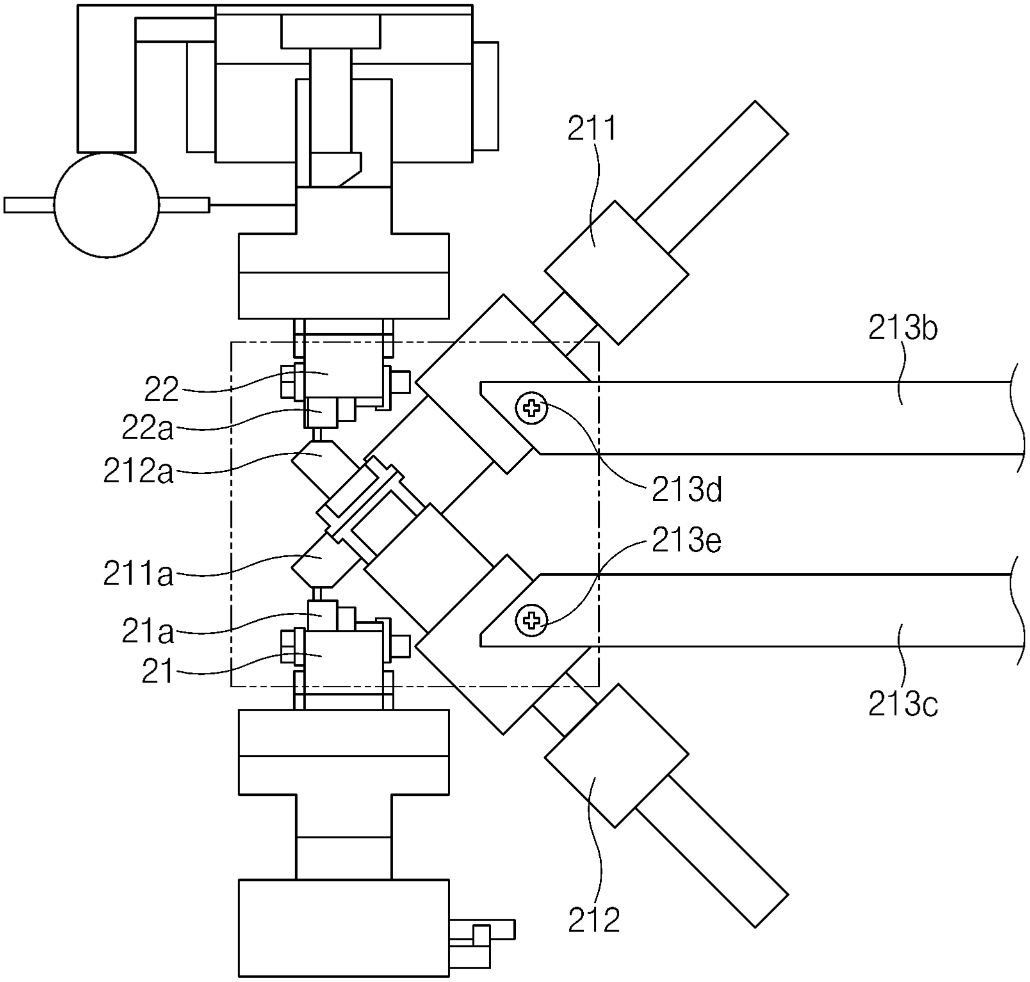
FIG. 12 is a side view of FIG. 11.

As illustrated in FIGS. 11 and 12, cleaning equipment of a sealing tool according to a second embodiment of the present invention may include a plasma generator 100 and a torch device 200 having a torch head 210, and the torch head 210 may include a first torch member 211, a second torch member 212 and a torch body 213.

Here, the torch body 213 may include a first angle adjusting piece 213*d* through which the first torch member 211 is coupled to a first bracket 213*b* so as to be adjustable in angle toward a pressing surface of a first sealing block.

That is, the first angle adjusting piece 213*d* has a bolt structure that is capable of being tightened or loosened and may be screw-coupled to a side portion of the first torch member 211 by passing through the first bracket 213*b*. Thus, when the first angle adjusting piece 213*d* is loosened, an angle of the first torch member 211 may be adjusted in a vertical direction when viewed in FIG. 12, with respect to the first angle adjusting piece 213*d*, and when the first angle adjusting piece 213*d* is tightened, the first torch member 211 may be compressed to the first bracket 213*b*, thereby fixing the first torch member 211.

In addition, the torch body 213 may include a second angle adjusting piece 213*e* through which the second torch member 212 is coupled to a second bracket 213*c* so as to be adjustable in angle toward a pressing surface of a second sealing block.

That is, the second angle adjusting piece 213*e* has a bolt structure that is capable of being tightened or loosened and may be screw-coupled to a side portion of the second torch member 212 by passing through the second bracket 213*b*. Thus, when the second angle adjusting piece 213*e* is loosened, an angle of the second torch member 212 may be adjusted in the vertical direction when viewed in FIG. 12, with respect to the second angle adjusting piece 213*e*, and when the second angle adjusting piece 213*e* is tightened, the second torch member 212 may be compressed to the second bracket 213*c*, thereby fixing the second torch member 212.

Therefore, the cleaning equipment of the sealing tool according to the second embodiment of the present invention may include the first and second angle adjusting pieces 213*d* and 213*e* to adjust the inclined angles of the first and second torch members. As a result, first and second plasma outlets may be disposed toward the pressing surfaces of the first and second sealing blocks.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

10: Pouch
11: Accommodation part
12: Sealing part
20: Sealing tool
21: First sealing block
21*a*: Pressing surface
22: Second sealing block
22*a*: Pressing surface
100: Plasma generation device
200: Torch device
210: Torch head
211: First torch member
212: Second torch member
213: Torch body
213*a*: Fixing plate
213*b*: First bracket
213*c*: Second bracket
213*d*: First angle adjusting piece
213*e*: Second angle adjusting piece
220: First height adjusting member
221: First guide piece
222: First adjusting screw
230: Second height adjusting member
231: Second guide piece
232: Second adjusting screw
240: First moving member
241: Guide rail
242: Guide piece
243: First driving piece
250: Second moving member
251: Movable piece
252: Second driving piece
260: Air supply member
300: Exhaust device
310: Exhaust tube
320: Filter
330: Ozone remover

The invention claimed is:

1. A cleaning equipment for a sealing tool having a first sealing block and a second sealing block spaced from the first sealing block in a first direction, the cleaning equipment comprising:

a plasma generator configured to generate plasma; and a torch device having a torch head configured to eject the plasma generated in the plasma generator to pressing surfaces of the first sealing block and the second sealing block so as to remove foreign substances accumulated on the pressing surfaces of the first sealing block and the second sealing block, the torch head including:

a first torch member having a first plasma outlet configured to eject the plasma generated in the plasma generator to the pressing surface of the first sealing block;

a second torch member having a second plasma outlet configured to eject the plasma generated in the plasma generator to the pressing surface of the second sealing block; and a torch body to which the first torch member and the second torch member are coupled, the torch body including:

a fixing plate;

a first bracket located at a first end of the fixing plate, the first torch member being inclinedly coupled to the first bracket so that the first plasma outlet faces the pressing surface of the first sealing block; and a second bracket located at a second end of the fixing plate, the second torch member being inclinedly coupled to the second bracket so that the second plasma outlet faces the pressing surface of the second sealing block.

2. The cleaning equipment of claim 1, wherein the first plasma outlet of the first torch member is configured to be spaced a distance of 1.0 mm to 5.0 mm from the pressing surface of the first sealing block, and wherein the second plasma outlet of the second torch member is configured to be spaced a distance of 1.0 mm to 5.0 mm from the pressing surface of the second sealing block.

3. The cleaning equipment of claim 1, wherein the torch body further comprises:

a first angle adjusting piece coupling the first torch member to the first bracket so that an angle of the first torch member is adjustable with respect to the pressing surface of the first sealing block; and a second angle adjusting piece coupling the second torch member to the second bracket so that an angle of the second torch member is adjustable with respect to the pressing surface of the second sealing block.

4. The cleaning equipment of claim 1, wherein the torch head further comprises:

a first height adjusting member coupling the first bracket to the first end of the fixing plate so as to be movable in the first direction; and a second height adjusting member coupling the second bracket to the second end of the fixing plate so as to be movable in the first direction.

5. The cleaning equipment of claim 4, wherein the fixing plate includes:

a first plate located at the first end of the fixing plate; and a second plate located at the second end of the fixing plate, wherein the first height adjusting member comprises:

a first guide piece connected to the first bracket;

a first adjusting screw screw-coupled to the first guide piece by passing through the first plate of the fixing plate, whereby, when the first adjusting screw rotates forward or backward, the first guide piece moves along the first direction; and wherein the second height adjusting member comprises:

a second guide piece connected to the second bracket; and a second adjusting screw screw-coupled to the second guide piece by passing through the second plate of the fixing plate, whereby, when the second adjusting screw rotates forward or backward, the second guide piece moves along the first direction.

6. The cleaning equipment of claim 1, further comprising an exhaust device configured to remove smoke, odor, or harmful gases, which are generated while the foreign substances accumulated on the pressing surfaces of the first sealing block and the second sealing block are removed.

7. The cleaning equipment of claim 6, wherein the exhaust device comprises an ozone remover configured to remove ozone contained in the harmful gases.

8. A cleaning equipment for a sealing tool having a first sealing block and a second sealing block spaced from the first sealing block in a first direction, the cleaning equipment comprising:

a plasma generator configured to generate plasma; and a torch device having a torch head configured to eject the plasma generated in the plasma generator to pressing surfaces of the first sealing block and the second sealing block so as to remove foreign substances accumulated on the pressing surfaces of the first sealing block and the second sealing block, the torch head including:

a first torch member having a first plasma outlet configured to eject the plasma generated in the plasma generator to the pressing surface of the first sealing block; and a second torch member having a second plasma outlet configured to eject the plasma generated in the plasma generator to the pressing surface of the second sealing block, wherein the torch device further comprises a first moving member configured to move the torch head in a longitudinal direction of the first sealing block and the second sealing block, the first moving member including:

a guide rail extending in the longitudinal direction of the first sealing block and the second sealing block;

a guide piece configured to move the torch head along the guide rail; and a first driver configured to move the guide piece along the guide rail.

9. The cleaning equipment of claim 8, wherein the torch device comprises a second moving member configured to move the torch head in a width direction of the first sealing block and the second sealing block so that the torch head is disposed at the pressing surfaces of the first sealing block and the second sealing block or to return the torch head to an original position, and wherein the second moving member includes:

a movable piece located between the guide piece and the torch head; and a second driver configured to move the moveable piece in the width direction of the first sealing block and the second sealing block.

10. The cleaning equipment of claim 8, further comprising an exhaust device configured to remove smoke, odor, or harmful gases, which are generated while the foreign substances accumulated on the pressing surfaces of the first sealing block and the second sealing block are removed.

11. The cleaning equipment of claim 10, wherein the exhaust device comprises an ozone remover configured to remove ozone contained in the harmful gases.

12. A cleaning method for a sealing tool, which is performed to remove foreign substances accumulated on a first sealing block and a second sealing block spaced from the first sealing block in a first direction, the cleaning method comprising:

generating plasma using a plasma generator; and ejecting the plasma generated by the plasma generator through a torch head to pressing surfaces of the first sealing block and the second sealing block to remove the foreign substances accumulated on the pressing surfaces of the first sealing block and the second sealing block, the torch head having a first torch member and a second torch member, the plasma being ejected from the first torch member and the second torch member to the pressing surfaces of the first sealing block and the second sealing block, respectively.

13. The cleaning method of claim 12, wherein, when the plasma is ejected on the pressing surfaces, radical oxygen (O) existing in the plasma and carbon (C), hydrogen (H), and oxygen (O), which exist in the foreign substances, chemically react with each other to form carbon dioxide ($CO_2$) and water ($H_2O$) so as to be removed.

14. The cleaning method of claim 12, further comprising, before generating the plasma, moving the torch head toward the first sealing block and the second sealing block so that the first torch member and the second torch member of the torch head are disposed to be spaced an effective distance from the pressing surfaces of the first sealing block and the second sealing block.

15. The cleaning method of claim 12, wherein the ejecting the plasma further comprises moving the torch head in a longitudinal direction of the first sealing block and the second sealing block, thereby removing the foreign substances accumulated on the pressing surfaces of the first sealing block and the second sealing block.

16. The cleaning method of claim 12, wherein ejecting the plasma further comprises removing smoke, odor, or harmful gases, which are generated while the foreign substances are removed, through an exhaust device.

* * * * *